Feb. 20, 1940. F. E. WENGER 2,190,962
TUBE TESTER
Filed Oct. 14, 1938
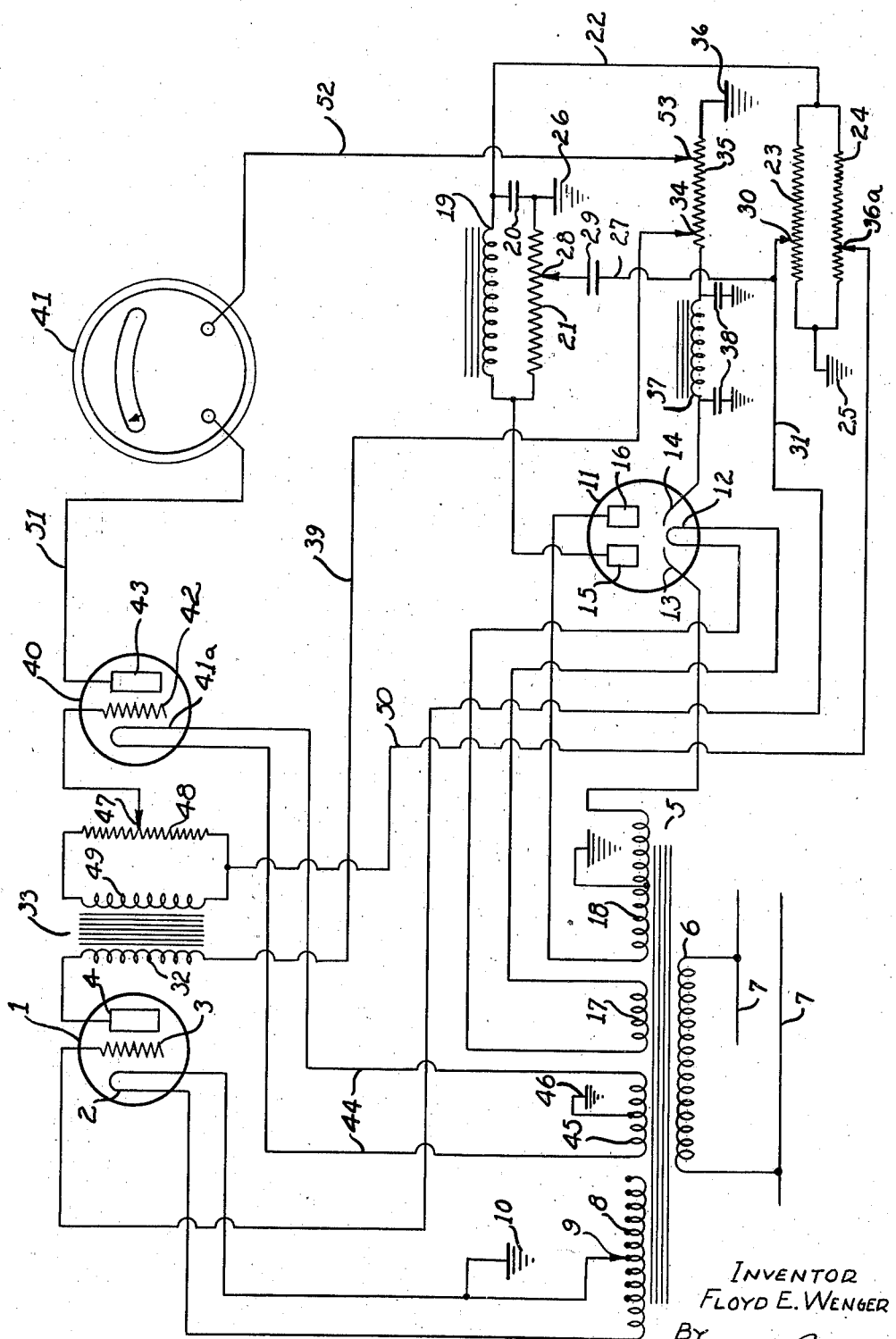
INVENTOR
FLOYD E. WENGER
By Toulmin & Toulmin
ATTORNEYS Patented Feb. 20, 1940

2,190,962

UNITED STATES PATENT OFFICE 2,190,962

TUBE TESTER

Floyd E. Wenger, Bluffton, Ohio, assignor to Ray L. Triplett, Bluffton, Ohio

Application October 14, 1938, Serial No. 235,032

4 Claims. (Cl. 250—27)

The present invention relates to electrical testing apparatus and, in particular, to the measurement of the dynamic coefficient of space current devices, such as electronic tubes employed for radio and similar purposes.

According to the present day methods of measuring such coefficients, it is customary to connect the tube under test either directly to a dynamometer form of measuring instrument or indirectly through a rectifier, in which case the instrument is of the direct current or D'Arsonval type. In the case of the direct connection, it has been found that the alternating current ammeter is somewhat insensitive, because the energy for the moving and stationary coils is abstracted and, therefore, seriously detracts from the output energy of the tube under test.

In the rectifier form of connection, a copper oxide (Rectox) or a two-electrode tube is usually employed. However, these devices are also affected by error in that the copper oxide layer may become de-activated and the thermionic device is subject to deleterious space charge effects. In addition, both forms of devices introduce errors brought about by changes in temperature in load conditions. In all of these cases, it is difficult, if not completely impossible, to accurately match internal characteristics of the tube under test with the electrical characteristics of the immediately associated circuit.

The primary object of the present invention is to obviate these sources of error and in general to improve on the present day methods of, and apparatus for, determining the dynamic characteristics of a radio tube. This object is carried out in brief by interposing between the tube under test and the meter, a thermionic tube having a resonance cut-off, and operating the interposed tube at its cut-off value, that is, with no signal voltage on the grid, no current flows in the plate circuit. This interposed tube will be called hereinafter the "output tube."

Other objects and features will be apparent as the specification is perused in connection with the accompanying drawing, which shows a typical circuit for carrying out my invention.

In the drawing:

The figure shows a schematic diagram of a circuit, which may be employed for determining or measuring the dynamic coefficients of a radio tube in accordance with the present invention.

Referring to the drawing in detail, the tube under test is designated by the reference character 1 and is exemplified as taking the form of a three-electrode device having a filamentary cathode 2, a grid 3 and a plate 4. For energizing these electrodes, a transformer 5 is employed, the primary winding 6 of which is connected to the A. C. mains indicated at 7. The secondary of this transformer is constituted of a number of coils of which the lefthand coil 8, as shown, is connected through a variable tap indicated at 9 to the filament of the tube. This circuit is grounded at 10. The voltages for the grid and plate circuits of the tube 1 are obtained from a pair of half-wave rectifiers combined in a single bulb and designated by the reference character 11.

The elements of this double half-wave rectifier are constituted of a filament 12, a pair of cathodes 13, 14 and a pair of anodes 15, 16. The filament energy is obtained from a secondary coil 17, and connections between the cathode 13 and the anode 16 are taken from opposite ends of a secondary coil 18, the mid-point of which is grounded. The plate 15 is connected to a filter constituted of a choke coil 19 and a condenser 20 shunted by a fixed resistor 21. A connection 22 is taken from a terminal between the choke and condenser to a potentiometer network consisting of two fixed resistors 23 and 24 arranged in parallel and connected to ground as at 25. The terminal between the condenser 20 and the resistor 21 is also grounded as at 26.

There is a conductor 27 passing from an adjustable tap 28 on the resistor 21 through a condenser 29 to an adjustable tap 30 on the resistor 23. A connection 31 is taken from the adjustable tap 30 to the grid 3 of the tube under test and serves to apply a negative grid bias to the tube, the magnitude of which can be controlled by the position of the tap on the resistor 23.

The plate circuit of the tube 1 is connected through the primary coil 32 of a transformer 33 to an adjustable tap 34 on a resistor 35. One end of this resistor is connected to ground at 36, and the other end is connected through a filter consisting of a choke 37 and grounded condensers 38 to the cathod 14 of the rectifier 11.

A consideration of the circuits explained up to this point will show that there is available at the tap 30 a pulsating unidirectional potential of negative polarity with respect to ground which is applied or superposed on the grid 3. The space current path between the anode 15 and cathode 13 of the device 11 rectifies the alternating voltage obtained from the righthand portion of the coil 18, and this voltage is filtered through the elements 19 and 20 to remove or smooth out the current undulations to a large extent, but leaving a small ripple which serves as a source of signal voltage applied to the grid of tube 1. This voltage is impressed across the two resistances 23, 24. The connections within the rectifier are such that the righthand ends (as shown) of the resistors 23, 24 represent terminals of positive potential with respect to ground so that the tap 30 as well as the tap 36a, the function of which will be described hereinafter, pick off negative voltage, the magnitude of which is determined by the position of the respective taps on their resistors.

On the other hand, the lefthand end (as shown) of the resistor 35 represents a terminal of positive potential, due to the manner in which the plate 16 and cathode 14 of the rectifier 11 are connected to the transformer energizing circuit. As in the case of the grid voltage, the current through the resistor 35 is filtered by the choke-condenser network 37, 38, to provide a voltage of substantially constant magnitude. The voltage at the tap 34 is of positive polarity with respect to ground and is impressed on the plate 4 of the tube under test through the conductor 39 and the transformer primary 32.

As stated hereinbefore, in carrying out the objects of the present invention, I have interposed a thermionic device 40 between the tube under test and meter 41. While many types of thermionic devices may be used for the element 40, I prefer a so-called Class "B" amplifier, i. e., one in which the grid bias is approximately equal to the cut-off value so that the plate current is approximately zero when no exciting grid voltage is applied. In these devices, plate current flows during approximately one-half of each cycle when an exciting grid voltage of alternating character is present. However, proportionately good results are obtainable to the extent that the output tube approaches these ideal conditions. The tube 40 is, therefore, illustrated as taking the form of a pliotron and containing a filament 41a, a grid 42 and a plate 43.

The filament is energized through a circuit 44 connected to a transformer secondary 45, the mid-point of which is grounded at 46. The grid or electrostatic control element 42 is connected to a variable tap 47 which picks off potentials from a resistor 48. This resistor is connected across the secondary winding 49 of the transformer 33. A connection is taken from a point between the lower end (as shown) of the resistor 48 and winding 49 through a conductor 50 to the tap 36a. The plate 43 is connected through a conductor 51 to one of the terminals of the measuring instrument 41 which is preferably a direct current ammeter. The other side of the meter 41 is connected through a conductor 52 to an adjustable tap 53 on the resistor 35.

A consideration of the connections to the tube 40 will show that a voltage of substantially constant magnitude, due to the filter action of the network 19, 20, is impressed or superposed on the grid 40. This voltage constitutes a grid bias potential, the magnitude of which can be determined by the position of the tap 36a on the resistor 24. The tap 53 on the resistor 35 may be adjusted to provide any desired magnitude of plate voltage applied to the tube 40.

From the foregoing, it is apparent that the rectifier 11 and filtering arrangement serve to convert the alternating current voltages applied to the transformer 5 into substantially constant unidirectional voltages which energize in a satisfactory manner the grid and plate circuits of both tubes 1 and 40. It is also evident that the output of the tube 1 under test feeds into the input circuit of the combined rectifier and amplifier 40, and the output of the latter, in terms of voltage or current variations, is impressed on the meter 41. The amplifier gain of the tube 40 may be adjusted at the tap 47 and this tap also serves as an element for calibrating the system in order that the readings on the meter 41 may be simplified, as will be explained hereinafter.

In the operation of the system, as described, a tube having a known dynamic coefficient is substituted for the tube 1 under test, and the voltages applied to the circuit including the position of all the various taps are adjusted in such a manner that the meter 41 will indicate a reading comparable to the known coefficient of the inserted tube.

The impedance of the circuit, looking to the right from the transformer primary 32, is adjusted by the taps in the input circuit of the tube 40 so as to provide a substantial matching of the combined tube impedances and the impedance of the meter. Instead of having the meter 41 register the indications in terms of numerical coefficients, it may be feasible, and in many cases highly desirable, to have the meter register or indicate solely as to whether the dynamic coefficients of the inserted tube are "good" or "bad." If the inserted tube is known to be a good tube, the meter and the associated circuits are calibrated to indicate this fact. The system is now ready for the measurement of the dynamic coefficients of a tube which is to be tested.

The tube having the unknown coefficients is placed at the position 1 and, if the circuit has been calibrated accurately, the meter 41 will indicate the desired coefficient either as a numeral or in terms of its quality as "good" or "bad."

In accordance with another feature of my invention, the potentials impressed on the tube 40 are such that the tube passes no plate current when there are no signal potentials impressed on the grid. In other words, the bias on the grid of the tube 40 is so adjusted that the plate current cuts off abruptly when there is no alternating or pulsatory potential applied to its grid. However, when the filtered pulsatory potential is applied to the grid 3 of the tube 1 under test, the current variations in the plate circuit of the tube are conveyed through the transformer 33 to change the potential applied to the grid 42 of the tube 40.

Under these conditions, the latter will conduct current, the value of which is indicated on the ammeter. It is evident that, by adjusting the tube 40 to an abrupt cut-off value, no plate current flows through this tube during standby intervals or during the time when no signal impulses are flowing through the first tube.

By obviating these losses, considerably more accuracy is attained in the system since the current reaching the meter 41 is determined solely by the signal impulses initiated at the tube under test. In addition to this advantage of reducing current losses, the tube 40 offers the advantage of amplifying the signal voltages so that the meter 41 need not be as sensitive as in the case of the prior art systems. The fact that only direct current flows in the plate circuit of the tube 40 permits the use of a direct current ammeter of the D'Arsonval type, which requires only a small amount of energy to operate the same, since part of the energy for rotating the moving coil is obtained from a permanent magnet within the meter.

It has also been found that the pliotron 40 is not subject to space charge effects, as might be the case if only a diode were used for this purpose. The tube 40, together with its associated transformer 3, permits a high degree of impedance matching between the tube 1 under test and the meter load which tends to increase the accuracy with which the meter registers or indicates the dynamic coefficients of the tube 1.

Other advantages of the output tube 40 will readily occur to those skilled in the art and I desire to comprehend within my invention such modifications of the output tube and associated circuits, as may be necessary to adapt it to varying conditions and uses. While it is conceivable that the tube 1 under test may be of a special character necessitating a tube 40 of special type, in general I have obtained good test results under diversified conditions, using any standard type of grid, amplifying tube, although the Class "B" type is preferred.

It is also desirable to select for the tube 40 a device having cut-off characteristics which are abrupt so that positively no plate current will flow when there are no signal voltages applied to the grid 42 from the tube under test. However, it will be understood that these conditions are optional, and the accuracy with which the meter 41 registers the desired dynamic coefficient depends on the closeness with which the characteristics of the tube 40 approach these ideal conditions.

It will, of course, readily occur to those skilled in the art what changes are necessary in the circuit connections, or rather in the magnitude of the various resistances and adjustments thereof, to differentiate between a reading on the meter which indicates amplification factor and a reading which indicates mutual conductance or any other tube coefficient. The circuit can obviously be calibrated to indicate any one of these readings, either in terms of a number or simply from the "good-bad" quality standpoint.

It will be understood that I desire to comprehend within my invention such modifications as come within the scope of the claims and the invention.

Having thus fully described my invention, what I claim as new and desire to secure by Letters Patent is:

1. A tube tester for measuring the dynamic coefficients of a thermionic tube under test having grid and plate circuits, means including a source of alternating current, a rectifier therefor and a filter for supplying direct current potentials to the plate and grid respectively of the tube under test but leaving ripples of sufficient amplitude in the grid potential to serve as signals, a thermionic device having input and output circuits, said input circuit being connected to the plate circuit of the tube under test, and said output circuit being connected to a measuring device, the combined impedances of the tube under test and of said thermionic device including the connections therebetween substantially matching the impedance of said measuring device.

2. A tube tester for measuring the dynamic coefficients of a thermionic tube under test, said tube having grid and plate circuits, means for applying variable potentials to said grid circuit, an output tube having input and output circuits, said input circuit being connected to the plate circuit of the tube under test, and said output circuit being connected to an electrical measuring device, means for applying substantially constant potentials to the plate circuit of the tube under test and to the input and ouput circuits of the output tube, both of said means comprising a common source of alternating current and a rectifier, and filtering means connected between said rectifier and the respective tubes for rendering the potential substantially constant but leaving sufficient pulsations in the grid potential of the tube under test to serve as signals, the effects of which are indicated on the measuring device.

3. A tube tester for measuring the dynamic coefficients of a thermionic tube under test, said tube having grid and plate circuits, an output tube having input and output circuits, said input circuits being connected to the plate circuit of the tube under test and said output circuit being connected to a measuring device, the input circuit of said output tube being biased to the extent sufficient to prevent current from flowing through the measuring device except when variable potentials are impressed on the grid circuit of the tube under test, a source of alternating current and a rectifier therefor, means for applying voltage from said rectifier to the grid and plate circuits of the tube under test, also to the input and output circuits of the output tube including the input circuit bias of said output tube, and filtering means in the circuits between said rectifier and the respective tubes.

4. A tube tester for measuring the dynamic coefficients of a thermionic tube under test, said tube having grid and plate circuits, an output tube having input and output circuits, said input circuit being connected to the plate circuit of the tube under test, and said output circuit being connected to an electrical measuring device, means for applying substantially constant potentials respectively to the plate circuit of the tube under test and of the output tube, means for biasing the input circuit of the output tube sufficiently to cause cut-off of the current in the output circuit except when variable potentials are applied to the grid circuit of the tube under test, a source of alternating current and a rectifier therefor, means for applying voltage from said rectifier to the grid and plate circuits of the tube under test, also to the input and output circuits of the output tube and including the input circuit bias of the output tube.

FLOYD E. WENGER.